Sept. 25, 1928.
H. H. WITZEL
1,685,690
AUTOMOBILE HEAD LAMP
Filed June 11, 1927     2 Sheets-Sheet 1
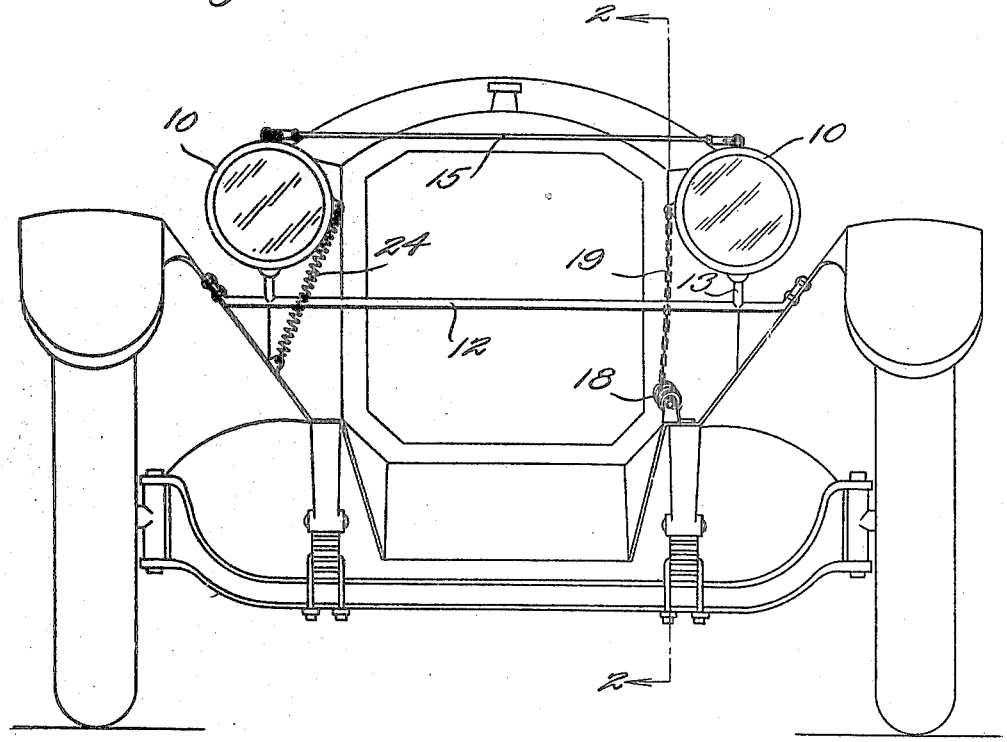
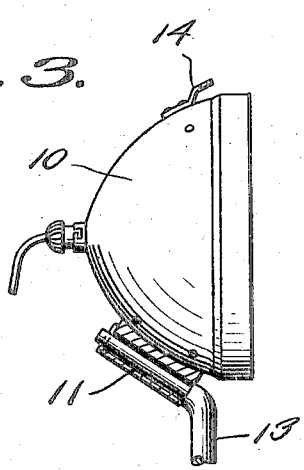
Henry H. Witzel
INVENTOR
BY Victor J. Evans
ATTORNEY
WITNESS:

Sept. 25, 1928.   H. H. WITZEL   1,685,690
AUTOMOBILE HEAD LAMP
Filed June 11, 1927   2 Sheets-Sheet 2
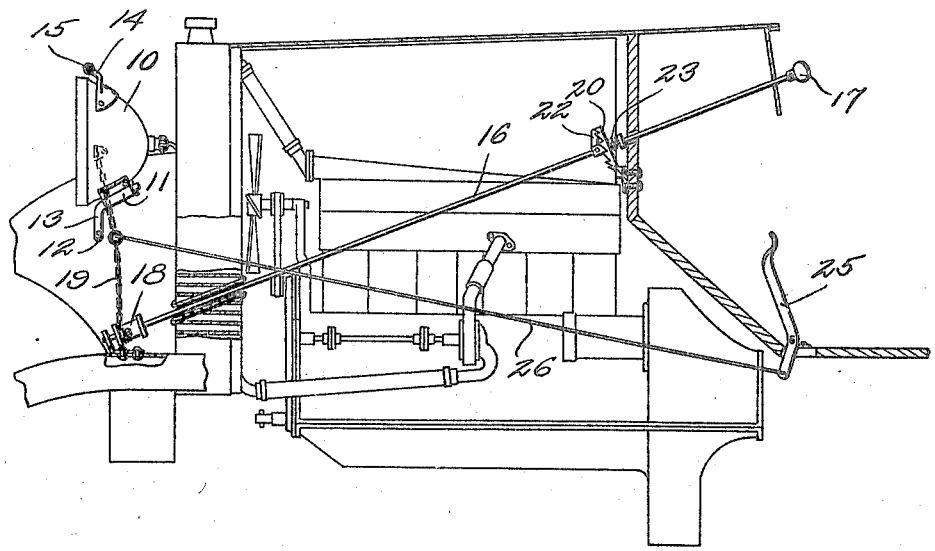
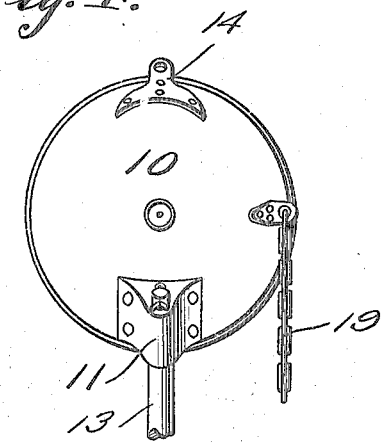
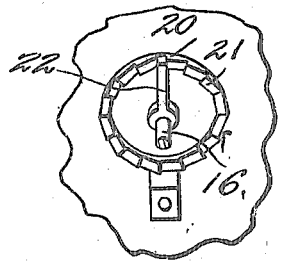
Henry H. Witzel
INVENTOR Patented Sept. 25, 1928.

1,685,690

UNITED STATES PATENT OFFICE.

HENRY H. WITZEL, OF MITCHELL, SOUTH DAKOTA.

AUTOMOBILE HEAD LAMP.

Application filed June 11, 1927. Serial No. 198,146.

It is the purpose of this invention to provide means whereby the headlights of an automobile may be shifted laterally and downwardly to prevent the light rays from interfering with the vision of the drivers of approaching vehicles, which frequently is the direct cause of accidents and collisions. The invention is also used for throwing the lights to the best position for the driver as they are focused to the edge of the road and in or near the ditch as desired.

In carrying out the invention I contemplate mounting the head lamps for such movement, and control the latter by means which can be operated either by the hand or foot of the driver of the vehicle so equipped.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a front elevation of an automobile showing the application of the invention.

Figure 2 is a sectional view on line 2—2 of Figure 1.

Figure 3 is a side elevation of one of the head lamps and its mounting.

Figure 4 is a rear view thereof.

Figure 5 is a detail view of the pawl and ratchet mechanism.

Referring to the drawings in detail 10 indicates the head lamps of an automobile, each lamp being provided with a bearing 11 as clearly illustrated in Figure 3. A supporting rod 12 is arranged transversely in front of the vehicle and terminally secured to the fenders in the ordinary well known manner. Rising from this rod are spaced standards 13, one for each head lamp 10, the upper end of the standard being offset obliquely and received by the bearing 11 of the lamp, so that the latter can be shifted laterally and downwardly as the occasion may require. Carried by each lamp at the top thereof is a bracket 14 terminally connected with the adjacent end of a rod 15, which connects both lamps, so that the latter are simultaneously adjusted in a manner to be presently described.

Arranged beneath the hood of the machine is a hand operated shaft 16 which projects through the instrument board and provided with a knob or other suitable handle 17. This shaft is mounted for rotation and supports a small drum 18 at its lower end which is disposed in advance of the radiator, the rod 16 passing through the radiator as illustrated in Figure 2. A chain or other suitable flexible element 19 has one end secured to the adjacent head lamp 10 and its other end secured to the drum 18, and adapted to be wound about and unwound from said drum incident to the rotation of the shaft 16. Surrounding this shaft 16 is a disk 20 having ratchet teeth 21 adapted to be engaged by a pawl 22 carried by the shaft, and held in engagement with the teeth by a spring 23 as illustrated in Figure 2. Consequently the lamps can be maintained in their adjusted position against the tension of a spring 24 terminally connected to one of the head lamps and also to the adjacent fender of the vehicle as illustrated in Figure 1. Of course when the pawl is released from the ratchet teeth, after the lamps have been shifted laterally, the spring 24 functions to return the lamps to their normal position.

The lamps may also be controlled by a foot pedal 25 pivoted on the floor board of the car and having one end connected with the pedal 25, while the other end of the cable is connected with the flexible element 19 as clearly illustrated in Figure 2. The cable 26 passes between the hood and the radiator, which provides for a quick and ready adjustment as the occasion may require. Consequently, when the pedal 25 is depressed, a pull is exerted upon the flexible element 19 to shift the lamps in the manner above described. The foot controlled means is intended for use for short intervals such as meeting other vehicles on country roads, or when it is desired to shift the lamps for short periods. The hand control may be set at any desired position either right, left or straight.

While it is believed that from the foregoing description, the nature and advantages of the invention will be readily apparent, I desire to have it understood that I do not limit myself to the exact construction, and arrangement of parts herein described, and that such changes may be resorted to when desired as fall within the scope of what is claimed.

What is claimed is:

1. The combination with a pair of automobile head lamps, of means for supporting said lamps for lateral and downward movements, means connecting said lamps for simultaneous adjustment, a hand operated shaft mounted for rotation, and extended through the dash board and radiator of the machine, a drum carried by said shaft, a flexible element connected with one of said lamps and with said drum and adapted to be wound about and unwound therefrom, means for holding said lamps in their adjusted positions, and means for returning said lamps to their normal positions when released.

2. The combination with a pair of head lamps, of means for mounting said lamps for lateral and downward pivotal movements, means connecting said lamps for simultaneous adjustment, a hand operated shaft mounted for rotation, a flexible element connected with one of said lamps and shaft and adapted to be wound about and unwound from the latter, a foot operated pedal, a cable connecting the pedal with said flexible element, whereby said lamps can be adjusted independently of the hand operated shaft, and means for returning said lamps to normal positions when released.

In testimony whereof I affix my signature.

HENRY H. WITZEL.